United States Patent

Nakane et al.

Patent Number: 5,101,009
Date of Patent: Mar. 31, 1992

[54] COPOLYESTER RESINS AND METHODS OF MAKING THE SAME

[75] Inventors: Toshio Nakane; Hiroaki Konuma; Kenji Hijikata, all of Shizuoka, Japan

[73] Assignee: Polyplastics Co., Ltd., Osaka, Japan

[21] Appl. No.: 661,998

[22] Filed: Mar. 1, 1991

[30] Foreign Application Priority Data

Mar. 2, 1990 [JP] Japan .................................. 2-51425

[51] Int. Cl.$^5$ ............................................. C08G 63/20
[52] U.S. Cl. .................................. 528/272; 528/274; 528/307; 528/308.6
[58] Field of Search ............. 528/272, 274, 307, 308.6

[56] References Cited

U.S. PATENT DOCUMENTS 4,463,154  7/1984  Disteldorf et al. ..................... 528/45

Primary Examiner—John Kight, III
Assistant Examiner—S. A. Acquah
Attorney, Agent, or Firm—Nixon & Vanderhye

[57] ABSTRACT

A copolyester resin is the polycondensation reaction product of (a) terephthalic acid or a dialkyl terephthalate, (b) at least one alkylene glycol having 2 to 8 carbon atoms, and (c) a dimer diol having as a main component a compound of the following formula (1):

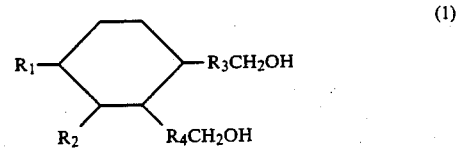

(1)

wherein $R_1$ through $R_4$ are each unsaturated linear organic groups such that the total number of carbon atoms of $R_1$, $R_2$, $R_3$ and $R_4$ is between 22 to 34. Preferably, $R_1$ and $R_2$, which may be the same or different, each represent an alkyl group, and $R_3$ and $R_4$, which may be the same or different, each represent an alkylene group. The resin of the present invention may be melt-blended with a filler material and formed into a film by suitable film-forming techniques. The film is especially advantageous due to its heat-sealing and mechanical properties.

13 Claims, No Drawings

COPOLYESTER RESINS AND METHODS OF MAKING THE SAME

FIELD OF INVENTION

The present invention generally relates to copolyester resins and to methods of making the same. More specifically, the present invention relates to copolyester resins which exhibit desirable properties, especially color hue, flexibility, and heat-sealability (particularly in film form).

BACKGROUND AND SUMMARY OF THE INVENTION

Aromatic polyesters such as polyethylene terephthalate (PET) and polybutylene terephthalate (PBT) are well known engineering resins due to their well-balanced physical properties, such as excellent heat-resistance, mechanical strength and gas impermeability. As such, aromatic polyesters are employed in a variety of end-use applications. However, since aromatic polyesters have glass transition (Tg) temperatures well in excess of room temperature, they typically cannot be used when high flexibility at low temperatures is a requirement of the end-use application. Another problem experienced by aromatic polyester resins is that, although the resins inherently exhibit excellent gas impermeability, this inherent property cannot effectively be utilized in film-form due to the poor heat sealing properties of films made of aromatic polyesters. It is towards solving these problems typically associated with aromatic polyesters that the present invention is directed.

Broadly, the present invention involves incorporating a specified comonomer unit in an aromatic polyester chain so as to form a copolyester having excellent color hue, high hydrolysis resistance and increased flexibility which is essentially unaffected even at low temperatures. The copolyester resins of the present invention may be formed into a film which exhibits excellent heat sealing properties.

The present invention more particularly relates to a copolyester resin produced by the polycondensation of (a) terephthalic acid or a dialkyl terephthalate, (b) at least one alkylene glycol having 2 to 8 carbon atoms and (c) a dimer diol mainly comprised of a compound of the following formula (1):

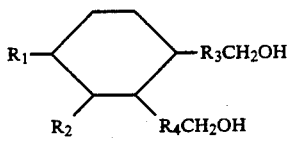

wherein $R_1$ through $R_4$ are each unsaturated linear organic groups such that the total number of carbon atoms for $R_1$, $R_2$, $R_3$ and $R_4$ is between 22 to 34, and specifically, $R_1$ and $R_2$, which may be the same or different, each represent an alkyl group, and $R_3$ and $R_4$ which may be the same or different, each represent an alkylene group.

The copolyester resins of the present invention may be employed as a base resin to form suitable compositions depending upon the desired end-use application. Preferably, the copolyester resin according to the present invention will contain at least inorganic and/or organic filler material.

Further aspects and advantages of this invention will become more clear from the discussion which follows.

DETAILED DESCRIPTION OF THE PREFERRED EXEMPLARY EMBODIMENTS

The starting components for producing the copolyester resins according to the present invention include terephthalate acid or a dialkyl terephthalate, preferably dimethyl terephthalate, at least one alkylene glycol having 2 to 8 carbon atoms and a "dimer diol" (to be defined below). Preferably, the alkylene glycol is selected from ethylene glycol, 1,3-propylene glycol and 1,4-butylene glycol, among which 1,4-butylene glycol is especially preferred.

The characteristic feature of the present invention is the inclusion of a "dimer diol" as component (c). As used herein and in the accompanying claims, the term "dimer diol" is intended to refer to a diol compound of the following formula (1) which is obtained by dimerizing an unsaturated fatty acid having between 15 to 21 carbon atoms and then reducing the dimer solution obtained thereby so it is present as a main constituent in an amount of at least 50% by weight of the dimer solution:

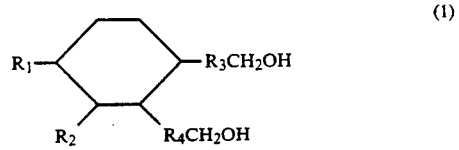

wherein $R_1$ through $R_4$ are each unsaturated linear organic groups where the total number of carbon atoms is between 22 to 34, and specifically $R_1$ and $R_2$, which may be the same or different, each represent an alkyl group, and $R_3$ and $R_4$, which may be the same or different, each represent an alkylene group.

Typical examples of dimer diols within the definition of general formula (1) are those wherein the total number of carbon atoms of $R_1$, $R_2$, $R_3$ and $R_4$ is 28.

The copolyester resin of the present invention produced by the polycondensation of the above-described components (a), (b) and (c) essentially comprise at least two main units of the following formulas (2) and (3):

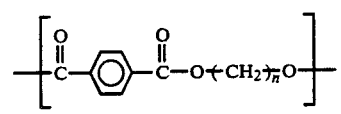

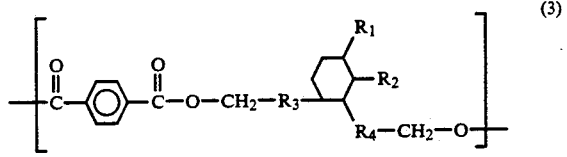

wherein $R_1$, $R_2$, $R_3$ and $R_4$ are as defined above, and n represents an integer between 2 to 8.

In the course of producing the dimer diol of the above formula (1), a diol compound of the following formula (1), a diol compound of the following formula (4) is also formed as a by-product, and in some cases may be used as an admixture with the dimer diol of the above formula (1) without being separated therefrom:

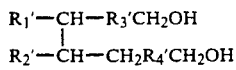

wherein $R'_1$ through $R'_4$ are each unsaturated substantially linear organic groups such that the total number of carbon atoms of $R'_1$, $R'_2$, $R'_3$ and $R'_4$ is between 25 to 37, particularly 31, and specifically $R'_1$ and $R'_2$, which may be the same or different, each represent an alkyl group, and $R'_3$ and $R'_4$, which may be the same or different, each represent an alkylene group.

In such a case, the copolyester comprises a main unit of the following formula (5) in addition to the above-described units of formulas (2) and (3):

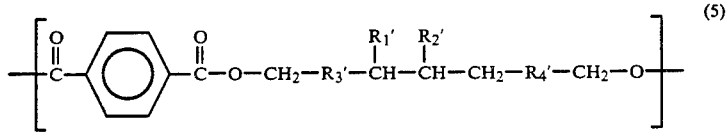

where $R'_1$-$R'_4$ are as defined above.

For example, usually a mixture of 60 to 85% by weight of the dimer diol of the formula (1) and 40 to 15% by weight of the diol compound of the formula (4) is used.

The dimer diol of the formula (1) may contain, in addition to the diol by product compound of the formula (4), a minor amount of a diol compound of the formula (1) wherein the positions of $R_1$ and $R_3CH_2OH$ are interchanged with one another and a diol compound having a bicyclo ring. The copolyester resin of the present invention may further comprise a small amount of another constituting unit derived from an auxiliary ester-forming monomer.

The copolyester resin of the present invention can be produced by the polycondensation of the above-described monomer components using typical copolymerization techniques for polyesters.

When the copolyester resin of the present invention is used as a resin to be injection-molded or as a resin to form a film or sheet, the amount of the dimer diol (c) to be introduced into the aromatic polyester molecule is preferably between 0.5 to 20 molar %, preferably between 5 to 10 molar %, based on terephthalic acid or the dialkyl terephthalate component (a) (i.e., based on the acid comonomer of the polyester).

When the amount of the dimer diol (c) is less than 0.5 molar %, none of the effects expected in the present invention (such as excellent impact resistance, low temperature flexibility, and heat-sealability) can be attained. On the contrary, when the dimer diol component exceeds 20 molar %, the melting point of the copolyester is significantly reduced to the extent that heat resistance (which is one desirable property of aromatic polyester resins generally) is deleteriously affected. However, when high heat resistance properties are not absolutely necessary, then more than 20 molar % of the dimer diol component (c) may be used.

The intrinsic viscosity (IV) of the copolyester resin of the present invention usually ranges from about 0.5 to about 2.0. The IV is preferably between about 1.0 to 1.5 from the viewpoint of the resin's film-forming properties. When a copolymer having a high intrinsic viscosity (in other words, a high degree of polymerization) is intended, the copolymer produced by melt polymerization is further subjected to conventional solid-phase polymerization so as to increase the molecular weight of the polyester.

Methods for forming a film or sheet from the copolyester resin include T-die methods and inflation methods, of which the latter is preferred.

The film or sheet made of the copolyester resin of the present invention (which can be quite easily heat-sealed) is suitable for use as a packaging material, since it has a low heat-sealing temperature and a wide heat-sealing temperature range of at least 20° C. To the contrary, conventional PBT film having a narrow heat-sealing temperature range cannot easily be heat-sealed. The film or sheet made of the copolyester resin of the present invention is suitable for use in storing frozen substances, since it has excellent low temperature flexibility.

The thickness of the film or the sheet made of copolyester resin according to the present invention is not particularly limited. However, if the film is too thin, the mechanical strength properties are relatively low and, as as result, is of no practical use. Films formed of copolyester resins of the present invention exhibit excellent-sealing properties even when the film is relatively thick. However, when the thickness of the copolyester resin film exceeds a certain limit, heat-sealing becomes more difficult. Therefore, the desirable thickness of a film or sheet formed from the copolyester resin according to the present invention is from 10 to 500 μm, and especially from 15 to 300 μm. The copolyester resin of the present invention is useful also as an injection molding resin due to its excellent impact resistance and low-temperature flexibility properties. Other thermoplastic resins, as well as organic and/or inorganic fillers may be incorporated into the copolyester resins of the present invention depending upon the desired end-use applications and the properties which are needed in such applications.

Examples of suitable thermoplastic resins that can be blended with the copolyester resin according to the present invention include polyolefins, such as polyethylenes; polypropylenes; aromatic polyesters of an aromatic dicarboxylic acid and a diol or hydroxy carboxylic acid, such as polyethylene terephthalate polybutylene terephthalate; as well as polyacetals (homopolymers and copolymers comprised mainly of repeating —$CH_2O$— units), polystyrene, polyvinyl chloride, polyamides, polycarbonates, ABS resins, polyphenylene oxides, polyphenylene sulfides and fluororesins. These thermoplastic resins may be used either alone or in the form of a mixture of two or more of the same.

The inorganic fillers my be fibrous, powdery or platy inorganic fillers which can be selected depending on the properties which are intended to be imparted to the resin.

Examples of fibrous fillers include inorganic fibrous materials such as glass fiber, asbestos fiber, silica fiber, silica/alumina fiber, alumina fiber, zirconia fiber, boron nitride fiber, silicon nitride fiber, boron fiber, potassium titanate fiber and fibers of metals such as stainless steel, aluminum, titanium, copper and brass.

Powdery fillers include carbon black; graphite; silicates such as silica, quartz powder, glass beads, milled glass fiber, glass balloon, glass powder, calcium silicate, aluminum silicate, kaolin, talc, clay, diatomaceous earth and wollastonite; metal oxides such as iron oxide, titanium oxide, zinc oxide, antimony trioxide and alumina; metal sulfates such as calcium carbonate and magnesium carbonate; as well as ferrit, silicon carbide silicon nitride, boron nitride and various metal powders.

The platy fillers include mica, glass flake and metal foil.

These inorganic fillers may be used either alone, or in combination of two or more of the same.

Preferred organic fillers include heat-resistant, high-tenacity synthetic fibers such as aromatic polyester fibers, liquid crystal polymer fibers and aromatic polyamide and polyimide fibers.

These inorganic or organic fillers may be used in combination with known surface-treating agents according to the properties that are desired. In this regard, preferred surface-treating agents include functional compounds such as epoxy compounds, isocyanate compounds, titanate compounds and silane compounds. The fillers may be used after having been surface-treated by these surface-treating agents or they may be added together with other components during preparation of compositions which include the copolyester resins of this invention.

The inorganic or organic filler is used in an amount of about 0.01 to 60% by weight based on the total composition weight.

The copolyester resin obtained by the present invention exhibits the following excellent effects:

(1) it is suitable for use as a material for bags, since it has excellent heat-sealability and it can be heat-sealed over a wide temperature range;

(2) it is suitable for use as a packaging material for foods to be kept in a freezer or to be cooked in a microwave oven, since the resin has high heat resistant and excellent gas-barrier properties and its flexibility is maintained even at low temperatures;

(3) the copolyester obtained in the present invention is also usable as a material for tubes and pipes which require a high flexibility formed by extrusion molding or injection molding.

EXAMPLES

The following nonlimiting Examples will further illustrate the present invention.

EXAMPLE 1

194.2 parts by weight of dimethyl terephthalate (DMT), 175.7 parts by weight of 1,4-butylene glycol (BG) and 26.9 parts by weight of dimer diol (DD)) were placed in a reactor equipped with a stirrer and a distillation tube together with a predetermined amount of a transersterification catalyst (tetrabutyl titanate). After thoroughly replacing the air in the reactor with nitrogen, the temperature was elevated to 160° C. under atmospheric pressure and stirring was started. The temperature was then further slowly elevated and the methanol formed as a by-product was distilled off. After the temperature reached 240° C., the pressure in the reactor was gradually reduced and the stirring was continued under a pressure of 0.2 Torr for 3.5 hours to give a copolyester having a limiting viscosity of 0.88.

The properties of the resultant copolyester were examined as described below.

The dimer diol unit introduction rate based on the acid component of the copolyester was determined according to $^1$H-NMR spectroscopy using trifluoroacetic acid-d as the solvent.

The glass transition point (Tg) and melting point (Tm) were determined according to JIS K 7121.

The copolyester was melted at 240° C. and extruded through a T-die onto a cooling roll at 25° C. to form a sheet having a thickness of 200 μm.

To examine the deterioration of the properties of the sheet at low temperature, tensile impact breaking strengths at 0° C., −10° C. and −20° C. were determined at a pulling rate of 100 mm/sec according to JIS Z 1702 to calculate the rententivity thereof based on the strength at ambient temperature.

To determine hydrolysis resistance, the sheet was immersed in hot water at 90° C. for 20 days and then dried at 100° C. for 2 h to determine the retentivity of the tensile impact breaking strength.

EXAMPLES 2 and 3

Polymerization was conducted in the same manner as that of Example 1, except that the amounts of BG and DDO were varied to give copolyesters having various compositions. They were evaluated in the same manner as that of Example 1, with the results being given in Table 1.

COMPARATIVE EXAMPLE 1

Polymerization was conducted in the same manner as that of Example 1 except that DDO was omitted and the amount of BG was altered to 180.2 parts by weight to give a PBT polyester having a limiting viscosity of 0.88, which was evaluated in the same manner as that of Example 1. The results are given in Table 1.

EXAMPLE 4

The copolyester obtained in Example 2 was pelletized and the pellets were subjected to solid-state polymerization at 190° C. in a nitrogen stream to give a polyester with a high degree of polymerization, which was evaluated in the same manner as that of Example 1. The results are given in Table 1.

COMPARATIVE EXAMPLE 2

PBT was obtained in Comparative Example 1 was subjected to solid-phase polymerization in the same manner as that of Example 4 to give a polyester of a high degree of polymerization, which was evaluated in the same manner as that of Example 1. The results are given in Table 1.

TABLE 1

|  | Ex. 1 | Ex. 2 | Ex. 3 | Comp. Ex. 1 | Ex. 4 | Comp. Ex. 2 |
| --- | --- | --- | --- | --- | --- | --- |
| DMT (parts by weight) | 194.2 | 194.2 | 194.2 | 194.2 | 194.2 | 194.2 |
| BG (parts by weight) | 175.7 | 171.2 | 162.2 | 180.2 | 171.2 | 180.2 |
| DDO (parts by weight) | 26.9 | 53.7 | 107.5 | — | 53.7 | — |
| Limiting viscosity | 0.88 | 0.85 | 0.79 | 0.88 | 1.20 | 1.22 |
| Rate of introduction of DDO unit (molar %) | 5.0 | 9.9 | 20.1 | — | 9.9 | — |

TABLE 1-continued

| | Ex. 1 | Ex. 2 | Ex. 3 | Comp. Ex. 1 | Ex. 4 | Comp. Ex. 2 |
|---|---|---|---|---|---|---|
| Tg (°C.) | 24 | 22 | 21 | 30 | 22 | 30 |
| Tm (°C.) | 206 | 194 | 164 | 220 | 193 | 220 |
| Retentivity of tensile impact breakage strength at low temperature (%) | | | | | | |
| 0° C. | 81 | 81 | 85 | 43 | 79 | 41 |
| −10° C. | 67 | 74 | 81 | 35 | 66 | 34 |
| −20° C. | 60 | 64 | 79 | 35 | 62 | 30 |
| Hydrolysis resistance (%) | 76 | 80 | 88 | 60 | 75 | 54 |

EXAMPLE 5 AND COMPARATIVE EXAMPLE 3

The copolyester obtained in Example 1 or PBT obtained in Comparative Example 1 was melt-kneaded together with 10% by weight of glass fibers and a sheet was prepared therefrom in the same manner as that of Example 1. The sheet was evaluated in the same manner as that of Example 1. The results are given in Table 2.

TABLE 2

| | Ex. 5 | Comp. Ex. 3 |
|---|---|---|
| Retentivity of tensile impact breakage strength at low temperature (%) | | |
| 0° C. | 89 | 49 |
| −10° C. | 82 | 46 |
| −20° C. | 80 | 42 |
| Hydrolysis resistance (%) | 82 | 62 |

EXAMPLE 6

The copolyester having a high degree of polymerization as obtained in Example 4 was melted at 240° C. and formed into a film having a thickness of 40 μm by a conventional inflation film-forming method. Two films thus produced were put together and heat-sealed with a heat bar at varied temperatures to determine the heat-sealing strength thereof according to JIS Z 1707. The results are given in Table 3.

COMPARATIVE EXAMPLE 4

PBT having a high degree of polymerization as obtained in Comparative Example 2 was formed into a film and its heat-sealability was evaluated in the same manner as that of Example 6. The results are given in Table 3.

TABLE 3

| Temperature of heat bar (°C.) | Example 6 | Comparative Example 4 |
|---|---|---|
| 205 | heat-sealing impossible | heat-sealing impossible |
| 210 | 1.21 | heat-sealing impossible |
| 215 | 1.48 | heat-sealing impossible |
| 220 | 1.49 | heat-sealing impossible |
| 225 | 1.56 | heat-sealing impossible |
| 230 | 1.66 | heat-sealing impossible |
| 235 | 1.44 | heat-sealing impossible |
| 240 | melted | melted |

(unit of heat-sealing strength: kgf)

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A copolyester resin which is the polycondensation reaction product of (a) an acid component selected from terephthalic acid or a dialkyl terephthalate, (b) at least one alkylene glycol having 2 to 8 carbon atoms, and (c) a dimer diol having as a main component a compound of the following formula (1):

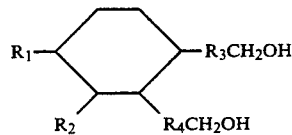

wherein $R_1$ through $R_4$ are each unsaturated linear organic groups such that the total number of carbon atoms of $R_1$, $R_2$, $R_3$ and $R_4$ is between 22 to 34.

2. A copolyester as in claim 1, wherein $R_1$ and $R_2$, which may be the same or different, each represent an alkyl group, and $R_3$ and $R_4$, which may be the same or different, each represent an alkylene group.

3. A copolyester resin according to claim 2 wherein the amount of the dimer diol (c) ranges from 0.5 to 20 molar % based on the acid component (a).

4. A copolyester resin according to claim 1, 2 or 3 wherein the alkylene glycol component (b) is 1,4-butylene glycol.

5. A copolyester resin composition comprising a blend of the copolyester resin according to any one of claims 1 to 3, and a filler material.

6. A copolyester resin according to claim 5, wherein said filler material is an organic or inorganic filler.

7. A heat-sealable polyester film consisting essentially of the copolyester resin according to any one of claims 1 to 3.

8. A heat-sealable film consisting essentially of the polyester resin composition of claim 5.

9. A shaped article consisting essentially of the copolyester resin composition of claim 5.

10. A method of making a copolyester resin comprising subjecting (a) an acid component selected from terephthalic acid or a dialkyl terephthalate, (b) at least one alkylene glycol having 2 to 8 carbon atoms, and (c) a dimer diol having as a main component a compound of the following formula (1):

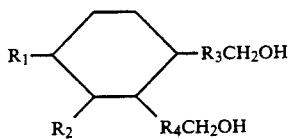

(1)

wherein R₁ through R₄ are each unsaturated linear organic groups such that the total number of carbon atoms of R₁, R₂, R₃ and R₄ is between 22 to 34, to polycondensation reaction conditions, and recovering the resulting polycondensation reaction product.

11. The method as in claim 10, wherein R₁ and R₂, which may be the same or different, each represent an alkyl group, and R₃ and R₄, which may be the same or different, each represent an alkylene group.

12. The method as in claim 11, wherein the amount of the dimer diol (c) ranges from 0.5 to 20 molar % based on the acid component (a).

13. The method as in claim 10, 11 or 12, wherein the alkylene glycol component (b) is 1,4-butylene glycol.

* * * * *

UNITED STATES PATENT AND TRADEMARK OFFICE
CERTIFICATE OF CORRECTION

PATENT NO. : 5,101,009
DATED : March 31, 1992
INVENTOR(S) : NAKANE et al

It is certified that error appears in the above-identified patent and that said Letters Patent is hereby corrected as shown below:

Column 2, line 64, delete "a diol compound of the following"
          line 65, delete "formula (1),".

Column 3, line 29, change "by product" to --by-product--.

Column 4, line 51, after "terephthalate" insert --and--.

Signed and Sealed this

Eighth Day of June, 1993

Attest:

MICHAEL K. KIRK

*Attesting Officer*   Acting Commissioner of Patents and Trademarks